United States Patent Office

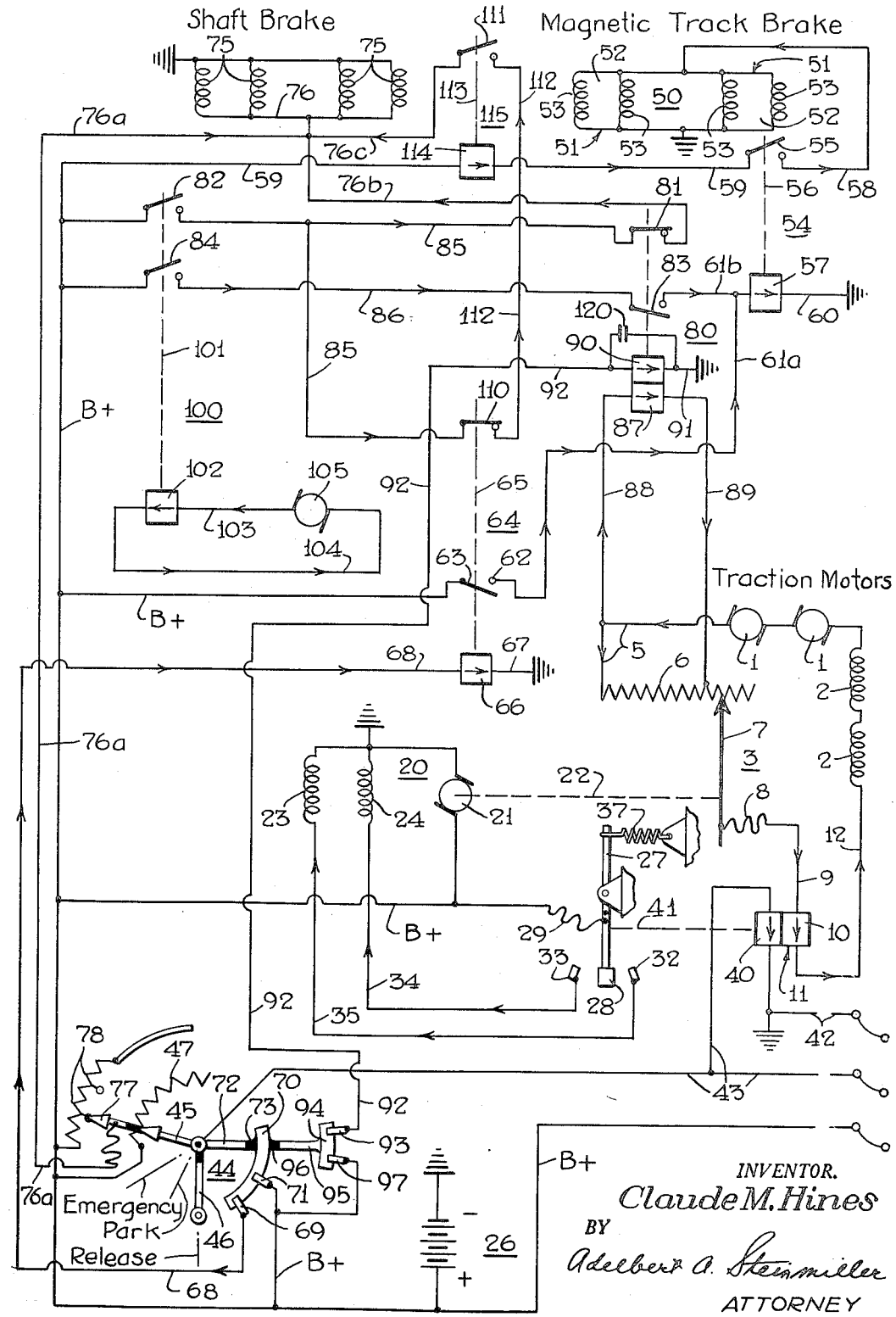

2,747,693
Patented May 29, 1956

2,747,693

ELECTRICAL CONTROL SYSTEM FOR BRAKES

Claude M. Hines, Verona, Pa., assignor to Westinghouse Air Brake Company, Wilmerding, Pa., a corporation of Pennsylvania Application November 24, 1951, Serial No. 258,066

5 Claims. (Cl. 188—33)

This invention relates to an electrical control system for brakes, and more particularly to such a system for controlling operation of multiple unit railway brake equipment comprising electro-dynamic, magnetic track, and spring-applied, solenoid-released shaft brakes.

It is an object of the invention to provide improved apparatus for controlling operation of the above type of brake equipment such that, when the vehicle is traveling above a certain speed, an operator may effect application of the dynamic brakes to decelerate the vehicle, with automatic application of the shaft brakes to complete a stop as speed of the vehicle reduces below said certain speed; and such that in event of failure of the dynamic brakes, with the vehicle traveling above said certain speed, the track brakes automatically will be applied to replace the dynamic brakes until speed of the vehicle is reduced below said certain speed, whereupon continued braking is transferred automatically to the shaft brakes to complete the stop and maintain braking of the vehicle while parked.

It is another object of the invention to provide improved apparatus for controlling operation of the multiple unit railway brake equipment such that, when the vehicle is traveling above the aforementioned certain speed, the operator may effect application of both the dynamic brakes and the track brakes in unison to decelerate the vehicle rapidly in an emergency, with assist from the shaft brakes automatically applied upon deceleration of the vehicle below said certain speed or upon failure of dynamic braking.

Other objects and advantages will become apparent from the following more detailed description of the invention taken in connection with the accompanying drawing in which the single figure is a schematic representation of the control apparatus embodying the invention as associated with a combined electro-dynamic, magnetic track, and shaft brake equipment which it controls.

Description dynamic braking portion of combined brake equipment

The dynamic braking portion of a combined brake equipment, such as above described, may comprise traction motors, two pairs of which are usually employed on an electrically propelled vehicle such as a subway car, for example; one pair of motors being connected to driving axles at one end of the car, and the other pair of motors being connected to driving axles at the opposite end of the car. Such traction motors, in the well-known manner, when supplied with electrical energy, act to propel the car, and when deprived of such electrical energy and properly controlled, the same motors act as electric generators for dynamic braking of the car. Only the latter application of the traction motors is of concern to this invention, and any of the equipment concerned with control of such motors when operating as prime movers or with conditioning said motors to act as generators has not been included herein.

As shown in the drawing, insofar as the traction motors are employed for dynamic braking, each motor comprises respective armatures 1 and fields 2 connected in series. Both motors act as generators for dynamic braking and are adapted to be connected in series in a dynamic braking circuit which includes a dynamic braking control rheostat 3 for varying resistance to current flowing through the traction motor fields 2, for thereby controlling the dynamic braking effort of the motors acting as generators, in the well-known manner.

With a particular polarity of the traction motors acting as generators assumed, current generated by these motors will flow in a direction indicated by the arrows shown in the drawing via a wire 5 into and through the usual resistance coils 6 and adjustable coil contact arm 7 of the rheostat 3; thence via an adjustable conductor 8 and wire 9 through a magnet coil 10 of a two-coil limit relay 11 (for reasons which will hereinafter become obvious in view of subsequent description) to return to the motors via a wire 12.

Movement of the contact arm 7 of the rheostat 3 relative to resistance coil 6 varies the amount of resistance in the dynamic braking circuit to regulate the current through the fields 2 of the traction motors acting as generators and thereby controls the degree of current generated at any given rotational speed of the armatures 1, hence controls the degree of dynamic braking at any given speed.

The apparatus for controlling operation of the rheostat 3 and thereby the dynamic braking operation of the traction motors, for sake of illustration, may comprise a reversible pilot motor 20 having the usual armature 21 with an operative connection, indicated by a dotted line 22, for actuating the contact arm 7 of rheostat 3. The pilot motor armature 21 will rotate in one direction or in its opposite direction in response to selective excitation of two shunt fields 23 or 24 for actuating the rheostat arm 7 to increase and decrease, respectively, resistance in the dynamic braking circuit to call for decrease and increase, respectively, in dynamic braking current through the traction motor fields to control dynamic braking force restraining rotation of the vehicle wheels.

For sake of illustration, a battery 26 may act as the source of electrical energy with which the pilot motor 20 is operated; the positive terminal of the battery being connected to a B+ supply wire and the negative terminal being connected to ground.

For controlling operation of the pilot motor 20, the two-coil limit relay 11 may be employed. The relay 11 comprises a movable contact arm 27 carrying a contact 28 having an electrical connection with the B+ supply wire and one terminal of the pilot motor armature 21 by way of a conducting portion of the arm 27, and an adjustable conductor 29. The contact 28 is disposed between two fixed contacts 32 and 33 both of which are connected electrically to ground and the opposite pole of the pilot motor armature 21 by way of wires 34 and 35 and the pilot motor fields 24 and 23, respectively. A bias tension spring 37 is suitably connected to contact arm 27 to urge the movable contact 28 carried by said arm into engagement with fixed contact 33 to complete electrical circuit between the B+ supply, the pilot motor field 24 and armature 21 to cause operation of the pilot motor in a direction to reduce resistance of rheostat 3 to the dynamic braking circuit to call for an increase in dynamic braking current, as will be appreciated from previous description. Action of the spring 37 on the contact arm 27 is opposed by additive magnetic effort generated by flow of current through the two coils of the relay 11; coil 10 through which dynamic braking current flows, and a coil 40 to be described subsequently. Operative connection between the coils 10, 40 and the contact arm 27 is indicated in the drawing by a dash line 41.

One terminal of the coil 40 of the relay 11 is connected electrically to ground via such as a wire 42, while the opposite terminal of the coil 40 is connected via a wire 43 and a variable resistance to the B+ supply wire.

The variable resistance may form part of an operator's control device 44 and, for sake of illustration, may comprise a contact arm 45 connected to wire 43 and movable by an operator's handle 46, which in actuality may be in the form of a foot pedal, relative to a resistance coil 47 connected to the B+ supply wire. By movement of the control handle 46 from a "Release" position to or intermediate an "Emergency" position, the resistance imposed by coil 47 to flow of current from the B+ supply wire to ground via coil 40 in relay 11 may be varied to and/or between a minimum and a maximum amount, respectively.

*Operation of dynamic braking control*

In operation of the apparatus for controlling dynamic braking, which apparatus per se forms no part of the invention, assume: that the traction motors are connected electrically as shown in the drawing to act as generators for dynamic braking of the vehicle; that such vehicle is traveling at a rate of speed sufficiently great to be capable of effecting any degree of dynamic braking within its operating range; that the control handle 46 is in "Release" position in which it is shown in the drawing, with a minimum amount of resistance imposed by resistance coil 47 in the limit relay coil 40 circuit so that a maximum amount of current from B+ supply will be flowing via wire 43 through said coil 40; and assume further that the contact arm 7 of the dynamic brake control rheostat 3 is positioned to call for a certain minimum and coasting rate of dynamic braking current and effort to be developed by rotation of the traction motor armatures 1 by virtue of excitation of the fields 2 by such current.

The dynamic braking current generated at the minimum or coasting rate will flow via rheostat 3 and wires 8, 9, and 12 in the dynamic braking circuit through the coil 10 in the limit relay 11, the coil 40 of which is being energized to maximum extent via control device 44. At this time, the coasting rate of current flowing through the coil 10 of the limit relay 11 and the rate flowing through the coil 40 of the same relay, by virtue of the design and arrangement of these coils to summarize their magnetic efforts, develop sufficient total magnetic effort acting via connection 41 on arm 27 to balance the opposing action of spring 37 on said arm and hold the arm in the position in which it is shown in the drawing with the movable contact 28 carried by said arm disposed intermediate fixed contacts 32 and 33 so that the pilot motor 20 will not be in operation, with the contact arm 7 of the dynamic braking control rheostat 3 remaining static in proper position as assumed.

Assume now that it is desired to effect a dynamic brake application in some particular desired degree. The operator will move the control handle 46 to a position out of "Release" toward "Emergency" in accord with the degree of dynamic brake application desired, thereby positioning the contact arm 45 relative to coil 47 correspondingly to increase the resistance to flow of current to the limit relay coil 40, with consequential reduction in such current, resulting momentarily in a loss in total magnetic effort imposed by the two coils on arm 27 to oppose action of spring 37. The spring 37 thus will be rendered effective to move arm 27 such that contact 28 is carried into engagement with fixed contact 33 to call for operation of the pilot motor 20 in a direction which moves the contact arm 7 for reducing the resistance of rheostat 3 presented to the dynamic braking circuit, thereby allowing more current to flow through the fields 2 of the traction motors to increase the amount of dynamic braking experienced by the vehicle wheels driving the motor armatures. Such increase in dynamic braking current will be experienced in the coil 10 of the limit relay 11 and results in increase in total magnetic effort generated in opposition to action of spring 37 on the contact arm 27 until the effect of the magnetic force from coils 10 and 40 acting on arm 27 balances the effect of spring 37 on said arm, at which time the arm again assumes a neutral position in which the contact 28 is disposed intermediate the contacts 32 and 33 to terminate operation of the pilot motor 20 and further adjustment of the dynamic braking control rheostat 3.

If a subsequent decrease in degree of dynamic braking is desired by the operator, he will move the control handle 46 back toward "Release" position, thus moving the contact arm 45 in a direction calling for imposition of a lesser amount of resistance of coil 47 to the circuit through the limit relay coil 40 with resultant increase in current flow through said coil. With such increase in current, the total magnetic effort generated in the limit relay will increase and cause unbalance of forces acting on contact arm 27 with resultant movement of said arm in opposition to spring 37 to cause engagement between movable contact 28 and fixed contact 32 to call for operation of the pilot motor 20 in the direction which moves contact arm 7 to increase the amount of resistance imposed by rheostat 3 to the dynamic braking circuit. Such movement of arm 7 by the pilot motor 20 will persist until the resultant reduction in dynamic braking current flowing through the coil 10 of the limit relay 11 again establishes equilibrium of forces acting on arm 27, whereupon said arm again assumes its neutral position to shut off the pilot motor and terminate further adjustment of the dynamic brake controlling rheostat 3.

The aforedescribed apparatus for controlling dynamic braking will automatically respond to effect adjustment of the dynamic brake control rheostat 3 in effort to maintain a constant degree of dynamic brake application as the traction motor armatures decelerate under influence of the restraining force imposed by braking opposing rotation of the vehicle wheels. Such reduction in rotational speed of the traction motor armatures, resulting in a decrease in dynamic braking current and effort generated, experienced in coil 10 of the limit relay 11 results in a reduction in total magnetic effort generated in said relay and consequential unbalance in forces acting on the contact arm 27 in favor of the spring 37 which will move said arm to cause engagement between contacts 28 and 33 for operating the pilot motor 20 in the direction for reducing resistance of rheostat 3 presented to the dynamic braking circuit in behalf of rendering the traction motors capable of generating the desired dynamic braking current, and effort, at the reducing rotational speeds of the traction motor armature 1 in accord with dictates of the controller 44. Once such increase in dynamic braking current at reducing rotational speeds of the traction motor armatures again reaches a value sufficient to re-establish equilibrium of forces acting on contact arm 27 of the limit relay 11, the spring 37 will move said arm to its intermediate position to terminate operation of the pilot motor 20 and thereby terminate further adjustment of the dynamic braking control rheostat 3 until subsequent unbalance of forces on limit relay arm 27 resulting from continued reduction in rotational speed of motor armatures 1, whereupon the limit relay 11 will again respond as above described to operate the pilot motor 20 for moving the contact arm 7 of the dynamic braking control rheostat 3 in the direction for decreasing resistance in the dynamic braking circuit in effort to maintain a degree of dynamic braking in accord with position of control handle 46. Once successive adjustment of the rheostat 3 results in cut out of all or substantially all rheostat resistance in the dynamic braking circuit, it will be appreciated that continued reduction in rotational speed of the motor armatures 1 will result in a continued reduction in generated dynamic braking current and hence continued reduction in dynamic braking effort, since compensation by reducing rheostat resistance in the dynamic braking circuit has reached its limit at full cut-out, and dynamic braking current and effort can no longer be maintained in accord with position of control handle 46. Such continued reduction in dynamic braking subsequent to full cut-out of the resistance of the dynamic braking control rheostat 3 will hereinafter be referred to as fading out of dynamic braking, and the condition at which such begins to occur will hereinafter be referred to as the "fade-out point" of dynamic braking, and such fade-out point will coincide, assuming integrity of operation of the pilot motor 20, with the contact arm 7 of the dynamic brake controlling rheostat 3 attaining its limit of travel with full cut-out of rheostat resistance in the dynamic braking circuit.

*Description of magnetic track brake portion of combined brake equipment*

For sake of illustration, schematically, the magnetic track brake comprises a plurality of the usual track brake shoes, a single shoe 50 of which is shown in the drawing, carried by a suitable member of the vehicle truck (not shown) and adapted to be urged by suitably attached electro-magnets 51 into frictional engagement with the upper surface of the rails (not shown) on which the vehicle travels.

The electro-magnets 51 for operating the track brakes simply comprises the usual metal core 52 adapted to be energized to generate a force attracting it toward the steel rail by electric current supplied to a coil or coils 53.

For controlling admission of energizing current to the magnet coils 53 of the magnetic track brake, a track brake control relay 54 is provided. The relay 54 comprises the usual switch 55 operably connected as indicated in the drawing by a dash line 56 to the usual relay coil 57, which coil when energized closes said switch, and when deenergized opens said switch. The outlet contact of the switch 55 is connected by means of a wire 58 to the magnet coils 53, while the inlet contact of said switch is connected to a branch wire 59 of the B+ supply wire. One terminal of the relay coil 57 is connected to ground by way of a wire 60, while the opposite terminal of said relay coil has a connection via a wire 61a with an outlet contact 62 of an emergency relay switch 63 comprised in an emergency relay 64; the input contact of the switch 63 is connected to a branch of the B+ supply wire. The emergency relay switch 63 is operably connected as indicated in the drawing by a dash line 65 to emergency relay coil means 66, one terminal of which is connected to ground via a wire 67, while the opposite terminal is connected via a wire 68 to an output contact 69 of an emergency relay control switch 70 comprised in the operator's control device 44; an input contact 71 of said switch 70 being connected to a branch of the B+ supply wire.

The emergency relay control switch 70 is attached for turning movement with the operator's control handle 46 by means of such as a connecting element 72 suitably isolated electrically from said switch by insulation 73.

In accord with desired features of the combined brake equipment, the switch 70 is arranged to bridge contacts 69 and 71 connecting wire 68 to the B+ supply wire in all positions of the control handle 46 other than "Emergency," in which latter positions switch 70 will be positioned to interrupt connection between contacts 69 and 71 and hence between wire 68 and the B+ supply wire.

By virtue of such arrangement of the switch 70, in all positions of the control handle 46 other than "Emergency" position, energizing current from the B+ supply wire is supplied to the emergency relay coil means 66 by way of wire 68 to cause the emergency relay switch 63 to be held in its open position in which it is shown in the drawing, so that no energizing current from B+ supply will flow via said switch into wire 61a to energize the track brake control relay coil 57.

When the operator's handle 46 is moved to "Emergency" position, the consequential opening of switch 70 will interrupt supply of energizing current to the emergency relay coil 66 via wire 68, with consequential closure of the emergency relay switch 63 to supply energizing current from B+ supply via wire 61a to the track brake control coil 57 for closing switch 55 and thereby in turn supplying current from B+ supply branch wire 59 via wire 58 to energize the magnet coils 53 for a track brake application.

It will be appreciated from previous description, that with the vehicle employing the brake equipment in motion at some speed sufficiently great to render the dynamic brakes effective, when the operator moves the control handle 46 out of "Release" position in the direction of "Emergency" position, a degree of dynamic braking is effected in accord with handle position up to a maximum degree corresponding to attainment of said handle in "Emergency" position, in which latter position such dynamic braking will be assisted by application of the track brake in fashion as above described. Such assist to dynamic braking by the track brakes being at the discretion of the operator to stop the vehicle in the least possible time in event of an emergency condition realized by said operator.

If for any reason, however, whether or not the vehicle is in motion and regardless of speed, the operator may effect application of the track brake by movement of the control handle 46 to "Emergency" position, thereby opening switch 70 to deenergize the emergency relay coil 66 which responds to effect energization of the track brake control relay coil 57 which closes switch 55 to connect the track brake application magnet coils 53 to the B+ branch wire 59.

*Description of shaft brake portion of combined brake equipment*

The shaft brake portion of the combined brake equipment may comprise the usual brake drum (not shown) suitably attached to rotate with such as the driving axle (not shown) on the vehicle. The usual brake shoes (not shown) are suitably arranged for frictional engagement with the drum to brake the axle for decelerating the vehicle. Such brake shoes are arranged to be actuated into engagement with the drum by the stored energy given up by release of a precompressed spring or springs (not shown). For controlling expansion and compression of the application springs on the shaft brake, solenoids 75, shown only symbolically in the drawing, are provided. One side of the solenoids 75 are connected to receive energizing current from a wire 76 when supplied thereto, while the outlet sides of the solenoids are grounded to allow for flow of such current through the solenoids when supply of current to wire 76 is in existence. The solenoids 75 are so adapted and arranged with respect to the brake application springs that said solenoids, when energized by supply of current to wire 76, will compress the springs to release the shaft brake, and when deenergized by termination of such supply will allow expansion of the precompressed springs to apply the shaft brake.

For controlling degree of energization and deenergization of the solenoids 75, and thereby controlling the degree of release and application, respectively, of the shaft brake, a branch wire 76a of the wire 76 is connected electrically to the movable contact arm 77 which cooperates with such as resistance elements 78 to regulate the amount of current admitted from B+ supply to wire 76 via said arm 77. The arm 77 is suitably attached for movement with the operator's control handle 46 in such fashion that in "Release" position of the operator's handle a minimum or substantially zero amount of resistance will be imparted by coils 78 between B+ supply and arm 77 so that a maximum amount of current will flow to the respective branch of the wire 76a and thereby to solenoids 75 to assure complete release of the spring-applied shaft brake. As the handle 46 is moved from "Release" position to a "Park" position, intermediate said "Release" position and "Emergency" position, the contact arm 77 in cooperation with resistance elements 78 will successively impart an increasing amount of resistance into the circuit through the shaft brake solenoids 75 via wire 76 up to a maximum amount corresponding to "Park" position of handle 46 so that the current from B+ supply flowing to said solenoids 75 via device 44 will be decreased in degrees until substantially no current is available from said device for energizing the solenoids 75 to hold the spring-applied shaft brakes released in all positions of handle 46 from "Park" position and including "Emergency" position.

*Description of the interlocked control system for the combined dynamic, track, and shaft brake equipment*

The interlocked control system embodying the invention comprises a two-coil lockout relay 80 having a first lockout relay switch 81 connected in series with a first speed interlock switch 82 and in parallel with the resistance elements 78 associated with the operator's control device 44 as previously described, to control a first alternate connection of the shaft brake solenoids 75 to B+ supply, and also having a second lockout relay switch 83 connected in series with a second speed interlock switch 84 and in parallel with the emergency relay switch 63 to control an alternate connection of the track brake control relay coil 57 with B+ supply.

Outlet of the first lockout relay switch 81 is connected to a branch wire 76b of the wire 76 in turn connected to the shaft brake solenoids 75 as aforementioned, while inlet to said first lockout relay switch 81 is connected via a wire 85 to the outlet of the first speed interlock switch 82; the inlet to said first speed interlock switch 82 being connected to a branch of the B+ supply wire.

Outlet of the second lockout relay switch 83 is connected to a wire 61b which joins wire 61a and has connection to the track brake control relay coil 57 as aforementioned while inlet to said second lockout relay switch 83 is connected via a wire 86 to the outlet of the second speed interlock switch 84, the inlet to which second speed interlock switch 84 is connected to a branch of the B+ supply wire.

For actuating the switches 81, 83, the lockout relay 80 is provided with a lockout relay coil 87 which is constantly connected into an electrical circuit by means of wires 88, 89 in such fashion as to receive a portion of the dynamic braking current generated by the traction motors during their operation as generators for effecting dynamic braking of the railway vehicle; for example, wires 88 and 89 may be tapped across the dynamic braking control rheostat resistance coil 6, as shown in the drawing, to cause a portion of the current supplied the dynamic braking circuit to flow through lockout relay coil 87.

When the degree of dynamic braking current generated by the traction motors is in excess of that amount which will be generated by virtue of movement of the vehicle at some such speed as one-half or one mile per hour, for example, with the operator's control handle 46 in some minimum braking position adjacent to but out of "Release" position in the direction of "Park," for example, the lockout relay coil 87 will be sufficiently energized by such current to hold the first and second lockout relay switches 81 and 83 closed and open, respectively, as shown in the drawing.

When the degree of dynamic braking current generated by the traction motors is less than that amount which normally will be generated by virtue of movement of the vehicle at the speed of one-half or one mile per hour, chosen for example above, with the operator's control handle 46 in its minimum braking position above defined, the lockout relay coil 87 no longer will be sufficiently energized to hold the first and second lockout relay switches 81 and 83 closed and open, respectively, and, in absence of other influences to the contrary, bias means (not shown) will cause said switches 81 and 83 to open and close, respectively, which action hereinafter will be referred to as dropping out of the lockout relay 80.

The lockout relay 80 further is provided with a second coil 90 also operatively connected to the lockout relay switches 81 and 83 and so arranged as to close and open said switches 81 and 83, respectively, when energized with current from B+ supply and to allow bias means (not shown) to open and close said switches 81 and 83, respectively, providing such switches are not otherwise under influence of the previously mentioned coil 87.

One terminal of the lockout relay coil 90 is connected to ground via such as a wire 91, while the opposite terminal is connected via a wire 92 to a fixed contact 93 associated with a switch 94 comprised in the operator's control device 44. The switch 94 is attached for turning movement with the operator's handle 46 through the medium of such as an arm 95, the switch 70, and the arm 72, for sake of schematic illustration, with provision of insulation 96 isolating electrically the one switch from the other.

For reasons which hereinafter will become apparent, in "Release" position of control handle 46 the switch 94 is arranged to bridge electrical contact between the fixed contact 93 connected to the wire 92 and another spaced apart fixed contact 97 which has a connection with the B+ supply wire. In all other positions of the control handle 46, the switch 94 will be positioned to interrupt electrical connection between fixed contacts 93, 97 so that electrical energy from B+ supply will not flow to wire 92 in such positions.

The first and second speed interlock switches 82 and 84 form part of a speed interlock relay 100 and are operably connected for operation in unison as indicated in the drawing by a dash line 101 to a speed interlock relay coil 102. The speed interlock relay coil 102 is connected by means of wires 103, 104 in an electrical circuit which includes a small permanent magnet generator 105 adapted to be constantly driven by or in accord with turning speed of the vehicle wheels so that output current from the generator to the speed interlock relay coil 102 will be a function of speed of the railway vehicle employing the equipment.

Design of the equipment is such that when speed of the railway vehicle is above and below some value, such as two miles per hour for example, the current output from the speed generator 105 flowing through the speed interlock relay coil 102 will vary above and below a corresponding value to cause, in unison, closing and opening, respectively, of the speed interlock switches 82 and 84.

For reasons which hereinafter will become obvious, the critical speed of the vehicle above and below which the lockout relay 80 will pick up and drop out when said lockout relay is under the control of the dynamic braking current flowing through coil 87 will always be less than the vehicle speed above and below which the speed interlock relay 100 picks up and drops out.

The control system further comprises a second alternate circuit for control of the solenoid released shaft brake, which circuit is in series with the first speed interlock switch 82 and in parallel with the lockout relay switch 81. This second alternate shaft brake circuit includes a second emergency relay switch 110 connected in series with a track brake interlock relay switch 111. Input to the emergency relay switch 110 is connected to a branch of the wire 85 leading from the speed interlock switch 82, and output from the relay switch 110 is connected via a wire 112 to the input to the track brake interlock relay switch 111, the output of which latter switch is connected to a branch wire 76c of the wire 76 leading to the shaft brake release solenoids 75 previously described.

The switch 111 is operably connected as indicated by a dash line 113 to a relay coil 114 also comprised in a track brake interlock relay 115.

The track brake interlock relay coil 114 is connected into the B+ supply branch wire 59 which feeds the magnetic track brake so that when the track brake is energized and applied, the coil 114 will be energized also to hold switch 111 closed, and when the magnetic track brake is deenergized and released said coil 114 also will be deenergized to allow switch 111 to be opened by the usual bias means (not shown).

Operation

In operation of the interlocked control system for the combined dynamic, track and shaft brake equipment, assume that the operator's brake control handle 46 is in its release position in which it is shown in the drawing and that the vehicle is in motion traveling at some speed in excess of two miles per hour so that the speed generator 105 will be generating sufficient current to hold the speed interlock relay 100 picked up with speed interlock switches 82 and 84 in closed positions, opposite to the positions in which they are shown in the drawing, connecting wires 85 and 86 to the B+ supply wire.

With the operator's control handle 46 in "Release" position and the vehicle in motion as assumed, as will be appreciated from previous description of operation of the control of dynamic braking, a minimum or coasting rate of dynamic braking current will be in generation by the traction motors, and the switch 94 movable with said handle 46 will be in the position in which it is shown in the drawing bridging contacts 93 and 97 and thereby maintaining energization of the lockout relay coil 90 by supply of energizing current from B+ supply via wire 92, consequently holding the lockout relay 80 picked up with lockout relay switches 81 and 83 in closed and open positions, respectively, in which they are shown in the drawing.

With lockout relay switch 81 thus closed, energizing current available to wire 85 from B+ supply, via the speed interlock switch 82 by virtue of speed of movement of the vehicle as aforedescribed, will flow to the release solenoids 75 of the shaft brakes via the branch wire 76b to maintain the shaft brakes on the vehicle released and therefore in accord with "Release" position of the brake control handle 46.

With the lockout relay switch 83 open as above mentioned, current from B+ supply available to wire 86 via the closed speed interlock switch 84 cannot flow via said switch 83 to the wire 61b leading to the track brake control relay coil 57.

Also, with the brake control handle 46 in its "Release" position as assumed, the switch 70 movable with said handle will be in the position in which it is shown in the drawing bridging fixed contacts 69 and 71 and thereby maintaining energization of the emergency relay coil 66 by electrical energy from B+ supply via said switch and wire 68.

With coil 66 thus energized via switch 70 in the operator's brake control device 44, the emergency relay 64 will be held picked up, with the switches 110 and 63 in closed and open positions, respectively, in which positions they are shown in the drawing.

With the emergency relay switch 63 open, B+ is cut off from the wire 61a leading to the track brake control relay coil 57, and since as above mentioned the alternate branch wire 61b is also cut off from B+ by the open lockout relay switch 83 at this time, said coil 57 will be deenergized with the track brake control relay 54 dropped out and its switch 55 consequently in an open position in which it is shown in the drawing, preventing flow of operating current from the branch wire 59 of B+ supply to the magnet coils 53 to assure release of the magnetic track brake.

Since no current is flowing through the B+ supply branch wire 59 at this time, the track brake interlock relay coil 114 will be deenergized, with switch 111 consequently in open position in which it is shown in the drawing, so that B+ supply current available to wire 112 via the closed emergency relay switch 110, wire 85 and the closed speed interlock switch 82 will not flow at this time to the branch wire 76c leading to the shaft brake release solenoids 75.

In addition to current supply to the shaft brake release solenoids 75 via the wire 76b, closed lockout relay switch 81, and closed speed interlock switch 82, said release solenoids 75 also receive current from B+ via the arms 45, 77 and resistance elements 78 in control device 44 in maximum amount corresponding to position of handle 46 to assure that the shaft brake will remain released in accord with "Release" position of the handle 46, even though the vehicle be motionless (contrary to previous assumption) with speed interlock switch 82 consequently open and interrupting connection of the branch wire 76b and B+ via the closed lockout relay switch 81 and wire 85.

Now assume, with the vehicle in motion and the brake control handle in its "Release" position as formerly assumed, and the members of the control system conditioned and positioned as described in preceding paragraphs, that the brake control handle 46 is moved out of its "Release" position to some position in the direction of but not to "Emergency" position to effect an application of dynamic brakes on the vehicle in degree in accord with such new position of handle 46 as hereinbefore described in detail under the heading of Operation of dynamic braking control.

As will be appreciated from previous description of dynamic braking control above referred to, a degree of dynamic braking current will be generated by the traction motors in accord with the new assumed position of the brake control handle 46 by virtue of the speed of the vehicle. The portion of such degree of dynamic braking current in flowing through the lockout relay coil 87 via wires 88 and 89 will be sufficient to hold the lockout relay 80 picked up with switches 81 and 83 closed and open, respectively, while the switch 94 associated with the brake control device 44 is opened to interrupt connection via wire 92 between B+ supply and the lockout relay coil 90 which consequently becomes deenergized; such as a condenser 120 shown in the drawing connected across lockout relay coil 90 between wires 91 and 92 may be employed to temporarily maintain energization of said lockout relay coil 90 when B+ is cut off to it by opening of switch 94 to allow time for the described establishment of the dynamic braking current through lockout relay coil 87 in response to movement of brake handle 46 to an application position out of "Release" position.

With the brake control handle 46 in an application position, during such time as the vehicle remains traveling at a speed in excess of several miles per hour as chosen example by virtue of such speed, the current output from the speed generator 105 driven in accord with vehicle speed will sufficiently energize the coil 102 to maintain the speed interlock relay 100 picked up with switches 82 and 84 consequently closed.

With the brake control handle 46 in an application position, so long as the vehicle remains traveling at a speed in excess of one-half mile per hour as previously chosen example, the portion of the dynamic braking current flowing through the lockout relay coil 87 will sufficiently energize same to hold that lockout relay 80 picked up, with switches 81 and 83, consequently remaining closed and open, respectively.

It will be seen then that at speeds of the vehicle above several miles per hour, with the brake control handle 46 in an application position, the speed interlock switch 82 and the lockout relay switch 81 remain closed, thereby maintaining electrical connection via wires 85, 76b between the shaft brake release solenoids 75 and B+ supply to maintain the shaft brakes released as the vehicle is being decelerated from the higher speeds by a dynamic brake application.

It also will be appreciated from the foregoing that with the brake control handle 46 in an application position and the vehicle traveling at speeds in excess of the several miles per hour example, that the speed interlock switch 84 and lockout relay switch 83 in series with said switch 84 remain closed and open, respectively, so that energizing current from B+ supply cannot flow to the track brake control relay coil 57 by way of these switches at this time.

Under the above circumstances with the lockout relay 80 picked up, so long as the brake control handle 46 remains in an application position intermediate "Release" and "Emergency" position, the switch 70 movable with said handle will bridge fixed contacts 69 and 71 to maintain electrical connection between wire 92 and B+ supply so that the emergency relay 64 will remain picked up by flow of current from wire 92 through the coil 66, thus holding switches 110 and 63 closed and open, respectively. With switch 63 open, no current will flow to the track brake control relay coil 57 via said switch, and since the alternate circuit to said coil also is interrupted by the open lockout relay switch 83, the track brake control relay 54 will remain dropped out with switch 55 open and the magnetic track brakes consequently will remain released as the vehicle is decelerated from the higher speeds by dynamic brake application alone.

When speed of the vehicle thus being decelerated by dynamic brake application alone reduces to such value as the several miles per hour chosen for example, output from the speed generator 105 driven in proportion to vehicle speed will reduce sufficiently to allow the speed interlock relay 100 to drop out, thereby opening switches 82 and 84.

With opening of the speed interlock switch 82 the previously existent electrical supply connection between the shaft brake release solenoids 75 and B+ supply, via the closed lockout relay switch 81, wire 85 and said switch 82, is interrupted and, in absence of supply of current from the alternate supply connection interrupted by the open switch 111 of the track brake interlock relay 115 whose coil 114 is deenergized since no current flows to the released magnetic track brake, the current supplied to said shaft brake release solenoids will be reduced to the extent allowed by the amount of current admitted thereto via the branch 76a to allow for application of the shaft brakes on the vehicle to assist the fading dynamic brakes to complete the vehicle stop; which extent as determines the degree of shaft brake application at this time is dependent upon position of the contact arm 77 relative to resistance elements 78 in turn dependent upon position of brake control handle 46, the amount of current to wire 76a being substantially nil intermediate "Park" and "Emergency" positions of handle 46 and increased in steps up to a maximum from "Park" to "Release," respectively.

When the vehicle thus being decelerated under restraint imposed by application of the shaft brakes as above described and by application of dynamic braking reduces below that at which the speed interlock relay 100 dropped out as above described to such as one-half mile per hour, the dynamic braking will have faded to such extent that the portion of dynamic braking current flowing through the lockout relay coil 87 will no longer sufficiently energize same to hold the lockout relay 80 picked up so that said lockout relay 80 will then drop out, opening and closing switches 81 and 83, respectively.

Opening of the lockout relay switch 81 at this time will have no effect on the shaft brakes since preceding opening of the speed interlock switch 82 in series with said lockout relay switch 81 already terminated supply of energizing current to shaft brake release solenoids via wire 76b as aforedescribed to effect application of the shaft brakes.

Closure of the lockout relay switch 83 with drop out of the lockout relay 80 will have no effect on the track brake control relay 54 at this time since previous opening of the speed interlock switch 84 prevents supply of energizing current to the track brake control relay coil 57 via wire 86 and, since the brake control handle 46 is assumed to be in a brake application position other than "Emergency" with switch 70 connecting wire 68 to B+ supply and emergency relay 64 consequently picked up holding switch 63 open, no current will be supplied to track brake control relay coil 57 via wire 61a, so that the track brake control relay 54 will remain dropped out with its switch 55 open, assuring continued release of the magnetic track brake as the vehicle is brought to a complete stop by the shaft brakes.

With the vehicle thus stopped, the brake control handle 46 may be allowed to remain in a brake application position such as "Park," which so positions the contact arm 77 relative to resistance elements 78 that full resistance is imposed by said elements between B+ supply and wire 76a so that a minimum or substantially zero amount of current will flow via said wire to the release solenoids 75, and in absence of current from wires 76c and 76b at this time, the release solenoids 75 will remain deenergized allowing the shaft brake to remain applied, restraining movement of the vehicle during parking.

When it is desired to release the brake application with the vehicle at standstill, the brake control handle 46 may be moved to "Release" position in which a minimum amount of resistance is presented by the resistance elements 78 to flow of current from B+ supply via arm 77 to wire 76 so that a maximum amount of current will flow to energize the release solenoids 75 to release the shaft brake.

In "Release" position of the brake control handle 46, with the shaft brake released by virtue of the supply of current to solenoids 75 by way of wire 76a, and the vehicle at a standstill, from previous description it will be appreciated that the speed interlock relay 100 will remain dropped out, with its two switches 82, 84 in their open positions in which they are shown in the drawing, since the speed generator 105 is idle and no current will flow through wires 103, 104 to energize the speed interlock relay coil 102; the switch 94 associated with the brake control device 44 will be closed, connecting wire 92 to B+ supply so that energizing current will flow to the lockout relay 80 to pick up same and cause switches 81 and 83 to assume the positions in which they are shown in the drawing, closed and open, respectively; the switch 70 associated with the brake control device 44 will remain closed, connecting wire 68 to B+ supply so that the emergency relay coil 66 will remain energized and holding the emergency relay 64 picked up, with switches 110 and 63 being held in the positions in which they are shown in the drawing, closed and open, respectively.

From the above it will be seen that: the open emergency relay switch 63 prevents supply of energizing current to the track brake control relay coil 57 by way of the wire 61a and the open lockout relay switch 83 prevents supply of such current to said track brake control relay coil 57 by way of the wire 61b, so that said track brake control relay coil 57 will remain deenergized with the track brake control relay switch 55 consequently in its open position in which it is shown in the drawing, preventing flow of current through B+ branch wire 59 to the application magnet coils 53, so that the magnetic track brake will remain released; in absence of flow of current through the B+ supply branch 59, the track brake interlock relay coil 114 will remain deenergized with the track brake interlock relay switch 111 consequently in the open position in which it is shown in the drawing, preventing supply of current via wire 76c to the release solenoids 75 already being supplied with current at this time via wire 76a as aforementioned; the open speed interlock relay switch 82 prevents supply of current to the release solenoids 75 via wire 85, the closed lockout relay switch 81, and the wire 76b at this time; from earlier description in regard to control of dynamic braking, it will be appreciated that in "Release" position of the brake control handle 46, the contact arm 45 will be positioned to cut out substantially all of resistance 47 from the circuit through the limit relay coil 40 so that same will be energized to its fullest extent and equalizing with the effects of spring 37 on arm 27 so that the pilot motor 20 will have caused the movable contact arm 7 to assume some such position in which it is shown in the drawing with all or substantially all of the dynamic braking control rheostat 6 resistance cut into the dynamic braking circuit in series with the traction motor fields 2 so that whether or not the vehicle is stationary or in motion, the field coils 2 will not receive sufficient energization to oppose rotation of said armatures in a manner constituting dynamic braking.

Now assume, with the brake control handle 46 in "Release" position and the shaft brakes, magnetic track brakes and dynamic brakes released, that the vehicle is brought into motion and accelerated. When speed of the vehicle increases above several miles per hour, current output from the speed generator 105 will sufficiently energize the speed interlock relay coil 102 to pick up the speed interlock relay 100 and thereby cause closure of the two speed interlock switches 82 and 84.

Closure of the speed interlock switch 82 will connect wire 85 to B+ supply, whereupon current will flow from wire 85 through the closed lockout relay switch 81 to the wire 76b, thence to the shaft brake release solenoids 75 which are energized sufficiently at the time by current from wire 76a by virtue of "Release" position of brake control handle 46 to maintain full release of the shaft brakes.

Closure of the speed interlock switch 84 as above mentioned will connect the wire 86 to B+ supply, but current from wire 86 is prevented from reaching the wire 61b at this time by the open lockout relay switch 83.

As the vehicle continues to travel in excess of several miles per hour, the speed generator 105 will continue to generate sufficient current to hold the speed interlock relay 100 picked up, with its switches 82 and 84 closed.

Now assume, with the vehicle traveling at a speed or speeds above several miles per hour with all brakes released, that it is desired to effect a service application of brakes on the vehicle to bring same to a normal stop. The operator will move the brake control handle 46 out of "Release" position to a position intermediate "Release" and "Emergency" position to call for a dynamic brake application in degree in accord with position of said handle as will be appreciated from previous description of control of dynamic braking.

As previously described, when the dynamic braking portion of the combined brake system is in proper functional order, the dynamic braking generated by the traction motors driven by wheels of the vehicle at such speeds as assumed will be sufficient to so energize the lockout relay coil 87 via wires 88, 89 as will maintain the lockout relay 80 picked up as lockout relay coil 90 becomes deenergized with timed delay by virtue of opening of switch 94 in control device 44 with movement of handle 46 out of "Release" position, otherwise the system remains conditioned as before with the shaft brake and magnetic track brake released while braking of the vehicle is effected electro-dynamically by the traction motors.

Now assume, with the vehicle still traveling in excess of several miles per hour and the speed interlock relay 100 consequently picked up and holding switches 82, 84 closed, that the electro-dynamic brakes fail, due to accidental opening of the electro-dynamic braking circuit, for example. Such failure will result in total loss of electro-dynamic braking current, hence in total loss of energization of the lockout relay coil 87 with resultant drop out of the lockout relay 80 and consequent opening and closure of the switches 81 and 83, respectively.

Closure of the lockout relay switch 83 will allow current from B+ supply to flow via the closed speed interlock switch 84, the wire 86, said switch 83 and wire 61b to the track brake control relay coil 57, energizing same to pick up the track brake control relay 54 and close switch 55 connecting wire 58 to the B+ supply branch wire 59 for causing energization of magnet coils 53 to apply the magnetic track brakes in place of the dynamic brakes which have failed.

As current flows to the track brake magnet coils 53 via closed switch 55 and B+ branch wire 59, the track brake interlock relay coil 114 will become energized to pick up the track brake interlock relay 115 and close switch 111 to maintain release of the shaft brakes through continued energization of release solenoids 75 by supply of current from B+ supply via the closed speed interlock switch 82, the wire 85, the closed emergency relay switch 110, the wire 112, said switch 111, and the wire 76c; as opening of the lockout relay switch 81 interrupts supply of current to said release solenoids 75 via wire 76b with drop out of the lockout relay 80 at time of dynamic brake failure.

With dynamic braking lost and the shaft brakes released and service application of braking on the vehicle thus maintained as above with automatic application of the magnetic track brake, assume that deceleration of the vehicle continues.

When speed of the vehicle thus decelerated reduces below the several miles per hour chosen for example, the output from the speed generator 105 through coil 102 reduces to the extent as allows the speed interlock relay 100 to drop out, thereby opening switches 82 and 84.

Opening of the speed interlock switch 84 terminates supply of current to the track brake control relay coil 57 by way of the wire 86, closed lockout relay switch 83 and wire 61b, thus deenergizing said coil 57 and allowing the track brake control relay 54 to drop out, opening the switch 55 and terminating supply of energizing current via B+ supply branch wire 59 to the track brake magnet coils 53 for release of the track brakes.

Simultaneously, opening of the speed interlock switch 82 also terminates supply of current to the shaft brake release solenoids 75 by way of wire 85, closed emergency relay switch 110, wire 112, switch 111 and wire 76c to allow the spring applied shaft brakes to apply to bring the vehicle to a stop and maintain braking during parking.

With termination of supply of current via B+ supply branch wire 59 to the magnet coils 53 of the track brake upon drop out of the track brake control relay 54, the track brake interlock relay coil 114 will become deenergized to allow switch 111 to open.

At the time that current is cut off to the shaft brake release solenoids 75 by way of wire 76c as above described to allow for application of the shaft brakes to complete the vehicle stop, if the brake control handle assumed to be in a brake application position intermediate "Release" and "Emergency" also is intermediate "Park" and "Emergency," the full resistance of resistance elements 78 will oppose flow of current to wire 76a so that substantially no current will flow thereto and such application of the shaft brakes will be in maximum degree, however, under the same circumstances when current is cut off from wire 76c to allow for application of the shaft brakes, if the operator's brake control handle 46 lies intermediate "Park" and "Release," only a portion of the total resistance of elements 78 will oppose flow of current from B+ to wire 76a so that some current will flow via said wire 76a to the release solenoids 75 to maintain partial energization thereof so that degree of shaft brake application will be lessened accordingly.

The handle 46 may be allowed to remain in a brake application position for the duration of the stop or may be returned to "Release" position in which it is shown in the drawing, whereupon a minimum amount of resistance of elements 78 will oppose flow of current from B+ supply to wire 76a which therefore will receive sufficient current to energize the release solenoids 75 as will fully release the shaft brake.

With the vehicle remaining stopped or in motion but at speeds less than the speed at which the speed interlock relay 100 will be picked up, the shaft brake may be applied and released in degree as desired by varying the current supplied to the release solenoid 75 via wire 76a through adjustment in position of the arm 77 relative to resistance element 78 as effected by movement of the brake control handle 46 intermediate "Release" and "Park."

Under the same conditions, when the handle 46 is moved beyond "Park" position in the direction of and including "Emergency" position, a minimum or zero amount of current will be supplied to wire 76a to allow for full application of the shaft brake. In moving handle 46 to "Emergency" position, in addition to full shaft brake application, the switch 70 in brake control device 44 will be opened to terminate supply of energizing current to emergency relay coil 66 via wire 68, allowing the emergency relay 64 to drop out and close switch 63 connecting B+ supply to the track brake control relay coil 57 via wire 61a and causing closure of switch 55 to supply energizing current to the magnet coil 53 for applying the track brakes in assist to the shaft brakes when desired.

Movement of handle 46 out of "Emergency" position again will cause closure of switch 70 to again energize emergency relay coil 66 via wire 68 and open switch 63 to terminate energization of track brake control relay coil 57 via wire 61a and open switch 55 to terminate application of the track brake.

Now against assume the vehicle to be traveling at a speed or speeds in excess of the several miles per hour required to pick up the speed interlock relay 100 so that speed interlock switches 82, 84 will be closed, and assume also that the operator's brake control handle 46 is in its "Release" position in which it is shown in the drawing.

As aforedescribed, under the above circumstances: the switch 70 in control device 44 will be closed, connecting the wire 68 to B+ supply so that the emergency relay 64 will be stuck up by virtue of energization of coil 66 with switches 110 and 63 closed and open, respectively, in which positions they are shown in the drawing; the switch 94 in control device 44 will be in its closed position in which it is shown in the drawing connecting the wire 92 to B+ supply so that the lockout relay 80 will be picked up by virtue of energization of coil 90, with switches 81 and 83 closed and open, respectively, in which position they are shown in the drawing; by virtue of position of the contact arm 45 relative to rheostat 47 in control device 44, as will be appreciated from previous detailed description of control of operation of dynamic braking, calling for a zero or minimum degree of dynamic braking so that little if any current will be flowing via wires 88, 89 through lockout relay coil 87; with both the emergency relay switch 63 and the lockout relay switch 83 in their open positions in which they are shown in the drawing, no current will be flowing via wires 61a and 61b to the track brake control relay coil 57 so that the track brake control relay 54 will be dropped out with switch 55 in its open position in which it is shown in the drawing, thereby preventing supply of current via B+ supply branch wire 59 to the magnet coils 53 in the magnetic track brake, so that said track brake will be released; by virtue of the position of contact arm 77 with respect to resistance elements 78 in brake control device 44, a maximum amount of current will be in supply to wire 76a which will be sufficient to energize the solenoids 75 for full release of the shaft brake, and with the speed interlock switch 82 and lockout relay switch 81 both closed, wire 76b will be connected to B+ supply via wire 85 so that the solenoids 75 also are availed of current thereby sufficient to maintain full release of the shaft brake when supply is cut off to wire 76a; with no current flowing through B+ supply branch wire 59 to the magnetic track brake, the track brake interlock relay 115 will be dropped out at this time with its switch 111 in its open position in which it is shown in the drawing, preventing supply of current to shaft brake release solenoids 75 also by way of wire 112, the closed emergency switch 110, wire 85 and the speed interlock switch 84 in a closed position opposite to that in which it is shown in the drawing.

Now assume, with the control system conditioned as set forth in the preceding paragraph, that the brake control handle 46 is moved from "Release" position to "Emergency" position to effect an intended emergency application of brakes on the vehicle.

In "Emergency" position of the brake control handle 46, maximum degree of dynamic braking is called for by virtue of position of contact arm 45 relative to the rheostat 47 in control device 44 as will be appreciated from previous description of control of dynamic braking, and, assuming such dynamic braking to materialize, resultant dynamic braking current generated by the traction motors at the vehicle speeds assumed, flowing via wires 88, 89, will sufficiently energize the lockout relay coil 87 to maintain the lockout relay 80 picked up, holding the switches 81 and 83 in their closed and open positions, respectively, in which they are shown in the drawing while the slow release coil 90 of the lockout relay becomes deenergized upon opening of the switch 94 in the control device 44 with initial movement of the control handle 46 out of "Release" position; upon the brake control lever 46 having attained "Emergency" position, the switch 70 will be opened to disconnect the wire 68 from B+ supply so that the emergency relay coil 66 will be deenergized to allow switches 110, 63 to open and close, respectively, whereupon the wire 61a will become connected to B+ supply to energize the track brake control relay coil 57 and thereby close switch 55, connecting the magnet coils 53 to B+ supply branch wire 59 for applying the magnetic track brakes in assist to dynamic braking to bring the vehicle to an emergency stop in a minimum time; in "Emergency" position of the brake control handle 46, the contact arm 77 associated with said handle will be so positioned relative to the resistance elements 78 that no current will be in supply to wire 76a; the track brake interlock relay 115 will be picked up, with switch 111 closed, by virtue of current flowing through coil 114 on its way to maintain the magnetic track brake applied, but at this time current is prevented from flowing via the closed switch 111 to wire 76c by the open emergency relay switch 110 in series with said switch 111; the shaft brakes will be held released during deceleration of the vehicle from the higher speeds under influence of the dynamic and magnetic track brake application by the current supplied from B+ to the shaft brake release solenoids 75 via wire 76b, the closed lockout relay switch 81, the wire 85, and the closed speed interlock switch 82.

When the speed of the vehicle thus being decelerated by combined dynamic and magnetic track brake application is reduced to several miles per hour, the reduced output from the speed generator 105 flowing through coil 102 will allow the speed interlock relay 100 to drop out, allowing switches 82 and 84 to assume their open positions in which they are shown in the drawing.

Opening of the speed interlock switch 82 as described above will result in termination of supply of current to the shaft brake release solenoids 75 by way of wire 75b, lockout relay switch 81, wire 85 and said switch 82. Since no current is in supply to wires 76a and 76c at the time that the current is cut off to the wire 76c, the release solenoids 75 will be availed of current from none of these wires and the shaft brake will apply to assist the magnetic track brake in bringing the vehicle to a rapid stop as dynamic braking fades out at the slower vehicle speeds.

Subsequent to drop out of the speed interlock relay 100 resulting in automatic application of the shaft brake as speed of the vehicle reduces below several miles per hour, the dynamic braking will fade out to such extent as the reduced dynamic braking current flowing via wires 88, 89 through the relay coil 87 will allow the lockout relay to drop out and thereby open and close switches 81 and 83, respectively, neither of which events affects the status of the magnetic track brake or the shaft brake which both will remain applied so long as the brake control handle remains in "Emergency" position.

The magnetic track brake may be released when desired by movement of the brake control handle 46 out of "Emergency" position to close the switch 70 associated with said handle and thereby effect supply of energizing current from B+ supply via wire 68 to again energize the emergency relay coil 66, thereby causing closure of the switch 110 and opening of the switch 63, which latter event terminates supply of energizing current to the track brake relay coil 57 via wire 61a, allowing for opening of the switch 55 to interrupt supply of current via B+ supply branch wire 59 to coils 53 and thereby terminate the magnetic track brake application.

In response to termination of flow of current through the B+ supply branch wire 59, hence through coil 114, the track brake interlock 115 will drop out and open switch 111 without consequence to the status of the shaft brake which will remain applied at this time.

Subsequent release of the shaft brake also may then be effected when desired by return of the brake control handle 46 to "Release" position wherein the contact arm 77 is so positioned relative to the resistance elements 78 that maximum current from B+ will be in supply to the release solenoids 75 via wire 76a to effect full release of the shaft brake.

Now assume again that the vehicle is traveling at speeds sufficiently great as allows for operation of the traction motors to generate any desired degree of dynamic braking and issume the brake control handle 46 to be in "Emergency" position with a maximum dynamic brake application and a magnetic track brake application in existence.

As set forth in immediately preceding paragraphs, it will be appreciated that under the circumstances, that is, with the intended emergency application of dynamic and magnetic track brakes in existence, the status of the various parts of the control system allowing for and influenced by such combined brake application will be as follows: the speed interlock relay 100 will be picked up with switches 82 and 84 closed by virtue of speed of the vehicle driving the speed generator 105; the emergency relay 64 will be dropped out with switches 110 and 63 in open and closed positions, respectively, opposite to the positions in which they are shown in the drawing; by virtue of the open switch 70 in "Emergency" position of the brake control handle 46 the track brake control relay 54 will be picked up and holding switch 55 closed by virtue of energization of coil 57 via the closed emergency relay switch 63; the track brake application will be maintained by virtue of current supplied coils 53 via branch wire 59 and closed switch 55; dynamic braking current generated by the traction motors, flowing via wires 88, 89 through the coil 87 will hold the lockout relay 80 picked up with its switches 81, 83 in closed and open positions, respectively, in which they are shown in the drawing; the shaft brake will be held released by virtue of energization of the release solenoids 75 via wire 76b, the closed lockout relay switch 81, wire 85, and the closed speed interlock switch 82; the track brake interlock relay 115 will be picked up by current flowing to the track brake through the coil 114 in series with branch wire 59 so that switch 111 will be closed, but no current will be in supply to wire 76c because of the open emergency relay switch 110 at this time; switch 70 in control device 44 will be open in "Emergency" position of control handle 44 so that the lockout relay coil 90 will be deenergized; and contact arm 77 will be so positioned in "Emergency" position of brake control handle 46 that the full resistance of element 78 will oppose flow of current thereby to wire 76a at this time.

Now assume: that the vehicle continues to travel at the relatively high speeds at which the speed generator delivers adequate current to the coil 102 to maintain the speed interlock relay 100 picked up with switches 82, 84 closed; that the brake control handle 46 remains in "Emergency" position calling for a combined dynamic and magnetic brake application; and, that dynamic braking fails accidentally, due to an open dynamic braking circuit, for example.

Upon such failure of dynamic braking, the dynamic braking current will reduce to zero with resultant termination of flow of current via wires 88, 89 through the lockout relay coil 87, allowing the lockout relay 80 to drop out and thereby open and close switches 81 and 83, respectively, it being remembered that lockout relay coil 90 is deprived of energizing current at the time by the open switch 94 in brake control device 44, so that loss of current also through the lockout relay coil 87 as related allows the lockout relay to drop out.

Upon opening the lockout relay switch 81, flow of current heretofore supplied to wire 76b via the closed speed interlock switch 82, wire 85 and the formerly closed switch 81 to maintain the shaft brake released will be terminated. Such termination of supply of current to wire 76b, occurring at a time when no current exists in wires 76a and 76c as aforedescribed, will result in complete deenergization of the release solenoids 75 for full application of the shaft brake to assist the magnetic track brake in maximum deceleration of the vehicle without benefit of the accidentally lost dynamic braking.

Both the shaft and the magnetic track brakes as thus applied will remain applied as the vehicle comes to and attains a stop so long as the brake control handle 46 remains in "Emergency" position and the lockout relay 80 remains dropped out.

With the lockout relay 80 dropped out and switch 83 closed, it should be pointed out that so long as the vehicle is traveling at a speed sufficient to maintain the speed interlock relay 100 picked up with switch 84 closed, movement of the brake control handle 46 out of "Emergency" position to a lesser application position with consequent closure of switch 70, pick-up of emergency relay 64 and thus termination of supply of current via switch 63 to wire 61a will not result in drop out of the track brake control relay 54 which will be maintained energized to hold the track brake application by current supplied to coil 57 via the closed speed interlock switch 84, wire 86, the closed switch 83 of the dropped out lockout relay 80, and the wire 61b. Obviously, when current is thus cut off to the wire 61a as a result of movement of the handle 46 out of "Emergency" position to the lesser application position, were said handle to remtain so out, the track brake automatically would be released when the vehicle slows down below the drop-out speed of the speed interlock relay 100 to open switch 84 and terminate supply of current also to the wire 61b with resultant deenergization of coil 57 and opening of switch 55 to terminate supply of energizing current to the track brake application magnet coils 53.

However, with the speed interlock relay 100 picked up, the lockout relay 80 dropped out and the shaft brake and the magnetic track brake both applied, both brakes may be fully released if desired by return of the brake control handle to "Release" position in which: switch 70 will be closed to maintain emergency relay 64 picked up and interrupting current supply to wire 61a; switch 94 will be closed to energize coil 90 and pick up the lockout relay 80, opening switch 83 and terminating current supply to wire 61b; and contact arm 77 will be so positioned relative to element 78 as will allow maximum current flow to wire 76a.

With current cut off to both wires 61a and 61b, the track brake control relay 54 will be dropped out to effect release of the track brake, and with maximum current in supply to wire 76a, the release solenoids 75 will be energized for full release of the shaft brake.

When the vehicle is at rest and the brake control handle 46 attains "Release" position the parts of the control equipment will assume the positions and conditions hereinbefore described in detail, with full release of shaft and track brakes in existence.

Having now described the invention, what I claim as new and desire to secure by Letters Patent, is:

1. On a railway vehicle, the combination with a source of electrical energy, of track brake magnet coils means energizable and deenergizable to apply and release, respectively, track brakes on said vehicle, shaft brake release solenoid means energizable and deenergizable to release and apply, respectively, spring-applied shaft brakes on said vehicle, an electro-dynamic braking circuit through which dynamic braking current generated by the vehicle's traction motors flows during a dynamic brake application, operator's brake control means operable manually to effect a dynamic brake application during travel of the vehicle, a track brake supply wire connected to said source, track brake control switch means having an input terminal connected to said supply wire and an output terminal connected to said track brake magnet coil means, track brake control relay coil means energizable and deenergizable to close and open, respectively, said track brake control switch means, a first lockout relay switch having an output connection with said track brake control relay coil means, a second lockout relay switch having an output connection with said shaft brake release solenoid means, speed interlock switch means having an input connection with said source and an output connection with the inputs of the first and second lockout relay switches, a track brake interlock switch having an input connection with the output of said speed interlock switch means and having an output connection also with said shaft brake release solenoid means, track brake interlock relay coil means energized and deenergized by establishment and disestablishment of flow of current through said track brake supply wire to cause said track brake interlock switch to close and open, respectively, means responsive to vehicle speeds above and below a certain speed value to close and open, respectively, said speed interlock switch means, and lockout relay coil means responsive to dynamic braking currents above a certain current value to open and close the first and second lockout relay switches, respectively, and responsive to reduction in flow of dynamic braking current below said certain current value to close and open the first and second lockout relay switches, respectively, said certain current value being generated by the traction motors during normal operation of dynamic braking at vehicle speeds below said certain speed value.

2. On a railway vehicle, the combination with a source of electrical energy, of shaft brake release solenoid means energizable in degree according to the desired degree of release of spring-applied shaft brakes, electro-dynamic brakes, operator's brake control means adjustable to regulate the degree of application of said electro-dynamic brakes and to regulate supply of current from said source to said shaft brake release solenoid means in inverse proportion to degree of electro-dynamic brake application called for, and vehicle speed responsive means effective, during an electro-dynamic brake application, so long as the vehicle speed exceeds a certain speed to cause said shaft brake release solenoid means to be connected to said source and when the vehicle speed reduces below said certain speed to cause said shaft brake release solenoid means to be disconnected from said source.

3. On a railway vehicle, the combination with a source of electrical energy, of track brake magnet coil means energizable and deenergizable to apply and release, respectively, track brakes, shaft brake release solenoid means energizable and deenergizable to release and apply, respectively, spring-applied shaft brakes, an electro-dynamic braking circuit through which dynamic braking current generated by the vehicle's traction motors flows in amount in direct proportion to degree of dynamic brake application, operator's brake control means operable manually to effect a dynamic brake application during travel of the vehicle and to establish connection between said track brake magnet coil means and said source of electrical energy, a speed interlock switch having an input connection with said source of electrical energy, a lockout relay switch having an input connection with the output of said speed interlock switch and having an output connection with said shaft brake release solenoid means, means responsive to variations in dynamic braking current above and below a certain value to close and open, respectively, said lockout relay switch, and means responsive to variations in travel speed of the vehicle above and below a certain value to close and open, respectively, said speed interlock switch.

4. On a railway vehicle, the combination with a source of electrical energy, of track brake magnet coil means energizable and deenergizable to apply and release, respectively, track brakes on said vehicle, shaft brake release solenoid means energizable and deenergizable to release and apply, respectively, spring-applied shaft brakes, an electro-dynamic braking circuit through which dynamic braking current generated by the vehicle's traction motors flows during a dynamic brake application, a track brake supply wire connected to said source, a track brake control switch having an input connection with said supply wire and an output connection with said magnet coil means, track brake control relay coil means energizable and deenergizable to close and open, respectively, said track brake control switch, a first lockout relay switch having an output connection with said shaft brake release solenoid means, a second lockout relay switch having an output connection with said track brake control relay coil means, speed interlock switch means having an input connection with said source and having an output connection with the inputs of the first and second lockout relay switches, vehicle speed sensitive means responsive to variations in vehicle speed above and below a certain speed value to close and open, respectively, said speed interlock switch means, a first lockout relay coil means responsive to increase in dynamic braking current above a certain current value to assure closing and opening of the first and second lockout relay switches, respectively, and responsive to decrease in dynamic braking current below said certain current value to urge opening and closing of said first and second lockout relay switches, respectively, said certain current value being generated by the traction motors during normal operation at vehicle speeds below said certain speed value, second lockout relay coil means energizable to assure closing and opening of the first and second lockout relay switches, respectively, and deenergizable to urge opening and closing of said first and second lockout relay switches, respectively, a first emergency relay switch having an input connection with the output of said speed interlock switch means, a track brake interlock relay switch having an input connection with the output of said first emergency relay switch and having an output connection with said shaft brake release solenoid means, a second emergency relay switch having an input connection with said source and an output connection with said track brake control relay coil means, emergency relay coil means energizable to close and open the first and second emergency relay switches, respectively, and deenergizable to open and close said first and second emergency relay switches, respectively, track brake interlock relay coil means energizable and deenergizable by flow and termination of flow of current through said track brake supply wire to close and open, respectively, said track brake interlock relay switch, and operator's brake control means comprising a handle adjustable to and intermediate a release position and a maximum braking position to effect corresponding degrees of dynamic braking, said brake control means also comprising a first switch having an input connection with said source and having an output connection with said second lockout relay coil means and being operable to closed and open positions by movement of said handle into and out of, respectively, said release position, said brake control means further comprising a second switch having an input connection with said source and an output connection with said emergency relay coil means and being operable to open and closed positions, by movement of said handle into and out of, respectively, said maximum braking position.

5. On a railway vehicle, the combination with a source of electrical energy, of track brake magnet coil means energizable and deenergizable to apply and release, respectively, track brakes on said vehicle, shaft brake release solenoid means energizable and deenergizable to release and apply, respectively, spring-applied shaft brakes on said vehicle, an electro-dynamic braking circuit through which dynamic braking current generated by the vehicle's traction motors flows during a dynamic brake application, a track brake supply wire connected to said source, a track brake control switch having an input connection with said supply wire and an output connection with said magnet coil means, track brake control relay coil means energizable and deenergizable to close and open, respectively, said track brake control switch, one circuit including a first lockout relay switch connected in series with said source and with said track brake control relay coil means, a second circuit including a second lockout relay switch connected in series with said source and with said shaft brake release solenoid means, speed interlock switch means connected in series in each of the two circuits, a lockout relay coil responsive to flow of current in said dynamic braking circuit to open said first lockout relay switch and to close said second lockout relay switch, and responsive to loss of flow of current through said dynamic braking circuit to close and open the first and second lockout relay switches, respectively, and means responsive to speed of said vehicle to close said speed interlock switch means above a certain vehicle speed and to open it below said certain speed.

References Cited in the file of this patent
UNITED STATES PATENTS

| | | |
|---|---|---|
| 2,257,301 | Larson | Sept. 30, 1941 |
| 2,366,029 | Hines | Dec. 26, 1944 |
| 2,368,726 | Piron | Feb. 6, 1945 |
| 2,590,034 | Piron | Mar. 18, 1952 |